United States Patent Office 3,265,160
Patented August 9, 1966

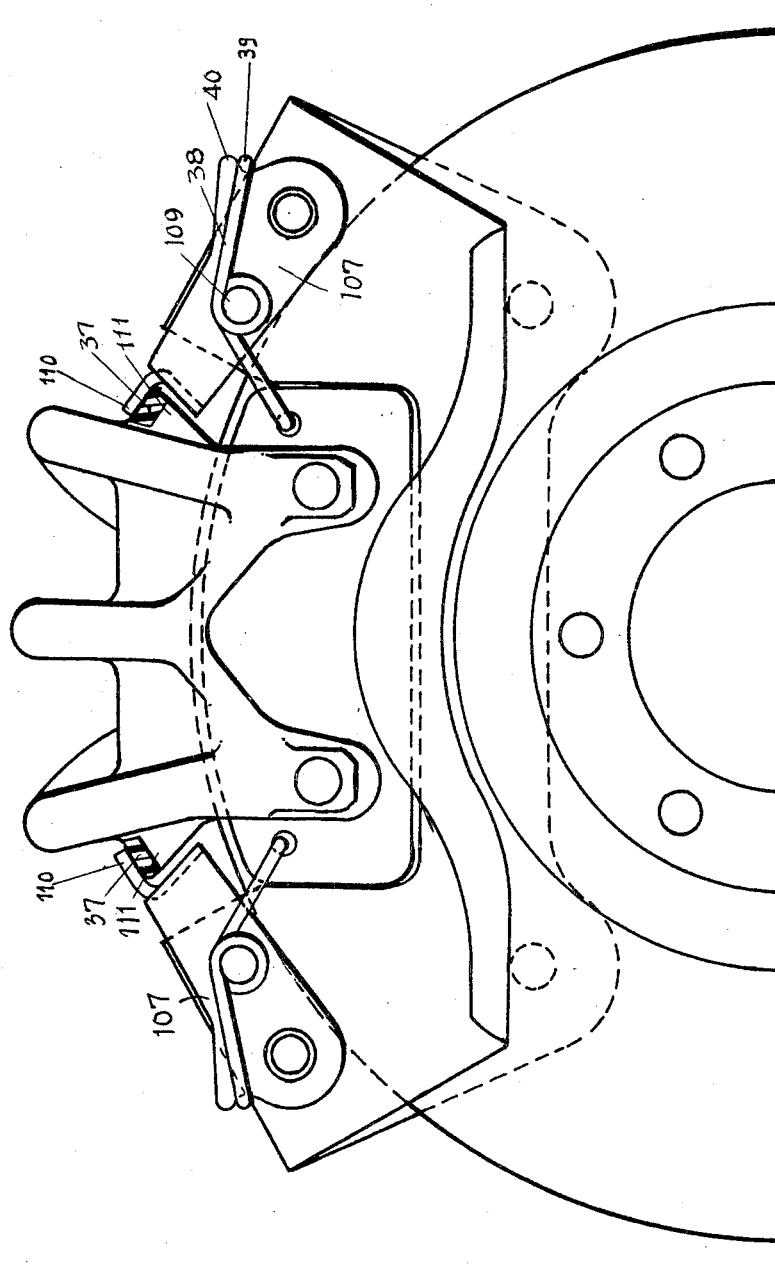

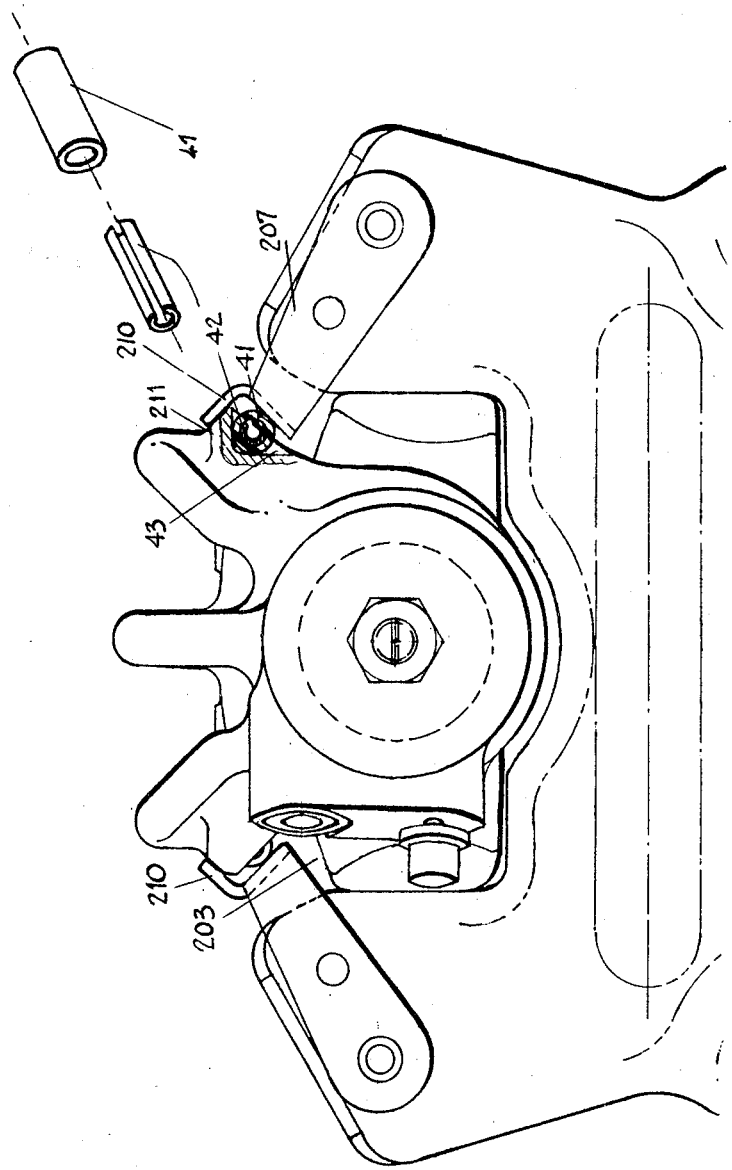

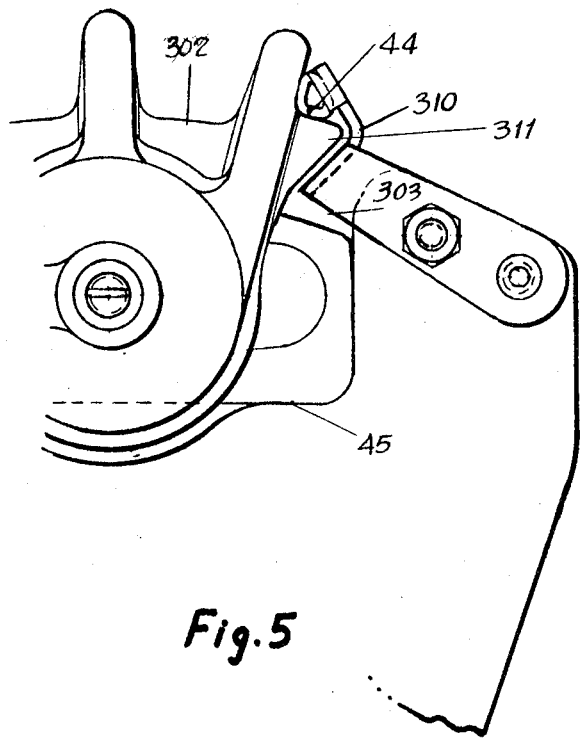

3,265,160
SPOT TYPE DISK BRAKES
Max Elberg, Vaucresson, and Pierre Gancel, Paris, France, assignors to Societe Anonyme D.B.A., Paris, France, a company of France
Continuation of application Ser. No. 299,246, Aug. 1, 1963. This application Oct. 11, 1965, Ser. No. 506,417
11 Claims. (Cl. 188—73)

This application is a continuation-in-whole of U.S. application Serial No. 299,246, filed on August 1, 1963, now abandoned.

The invention relates to a disk brake with a floating stirrup mounted in a recess formed on a fixed support which comprises two plates, the lateral edges of the recess on the two plates being adapted to act as an anchor for a pair of brake pads located in the recess on opposite sides of the disk and which are actuated by a control device forming part of the stirrup.

More particularly the invention provides a disk brake with a floating stirrup in which the axial guiding of the stirrup is realized by the fixed support so that the edges of the friction pads, having a generally rectangular shape, and located within the recess, do not come into contact with the guide means carried by the fixed support thus eliminating the drawback of bringing the friction pad edges into engagement with the guide means carried by the fixed support and which caused erosion of the friction pads at the point of contact with the guide levers. Attempts were made to alleviate this drawback by providing lugs on a reinforcement plate, on which the pads are molded, which engages the guide means. The space available for the provision of such metal lugs is restricted due to the fact that the friction pads anchor ends are formed by friction material alone. On the other hand the provision of the metal lugs, in the former brakes, was accompanied by a noise which occurred when these metal lugs, due to the jolts on the road, were brought into engagement with the friction pad guiding levers. Moreover, the friction pads provided a restricted surface for engagement by the pad guiding levers due to the relatively small thickness of the lining which also decreases with the increase of friction lining wear. These drawbacks are eliminated according to the invention due to the fact that the axial guiding of the stirrup is realized by the fixed support which enables the provision on the fixed support of a guiding surface of sufficient amplitude and the extent of which remains constant in spite of the wear of the lining. The guiding of the stirrup by the levers carried by the fixed support can preferably be realized through the intermediary of a yielding means which provides the advantage of taking up the differences occurring in course of manufacture. It is also possible to provide a special material, namely a plastic material with a low coefficient of friction, between the stirrup and the levers to facilitate the guiding and to suppress noise.

According to one feature of the invention the stirrup is guided by the fixed support by a pair of retractable levers pivotally mounted on the fixed support, the construction being such that the stirrup is urged into engagement with the levers which are locked in operative position thus effecting guiding of the stirrup by the fixed support and insuring an appropriate position for the friction pads in a recess formed in the fixed support. The pads are guided by the stirrup to which they are connected. In a preferable embodiment of the invention there are provided springs, operating in torsion, which urge the friction pads as well as the stirrup outwardly of the recess thus maintaining the stirrup in engagement with the fixed support through the intermediary of the levers. The springs can either be replaced or assisted by a yielding means formed by a sleeve made of rubber or of similar material and which can be reinforced by a metal member to provide a unit in which the yielding means urge the stirrup into engagement with the levers carried by the fixed support.

In one embodiment of the invention, the yielding means is arranged to urge the stirrup toward the open end of the recess so that the friction edges adjacent to the bottom of the recess are kept clear of the latter.

In another embodiment of the invention the yielding device is located between the stirrup and the guide levers carried by the fixed support with the construction being such that the stirrup is urged inwardly of the recess in such a manner that the friction pads take support on a seat provided for the friction pad edges on the bottom of the recess. This construction provides the advantage to reserve for the friction pads a seat formed in the fixed support and to confer to the friction pads a position strictly parallel to the disk and to alleviate the drawbacks of the prior brakes in which the guiding of the friction pads was performed by lugs formed on the guide levers. The lugs were not necessarily located in the same plane since the position thereof depended on the location of the levers pivotally mounted on the fixed support and locked by a clevis pin. This usually resulted in a certain misalignment of the levers with respect to the fixed support so that the friction pads took a position offset to the disk which lessens the efficiency of the brake.

Other features and advantages of the invention will become apparent from the following description of the preferred embodiments of the invention, given with reference to the enclosed drawings, in which:

FIGURE 3 is similar to FIGURE 1 and shows an embodiment in which projections formed at the respective ends of the stirrup are equipped with a block made from plastic material having a low coefficient of friction to facilitate the guiding of the stirrup by the fixed support;

FIGURE 4 is a front view of another embodiment and provides an exploded view of a flexible sheath and of the reinforcement member thereof forming the yielding device embodied in the means for guiding the stirrup by the fixed support; and FIGURE 5 is a front view of a portion of the preferred embodiment of the invention in which the yielding device located between the stirrup and the guiding levers therefor urges the friction pads interconnected with said stirrup into engagement with a seat formed at the bottom of the recess provided at the periphery of the fixed support.

Figure 1:
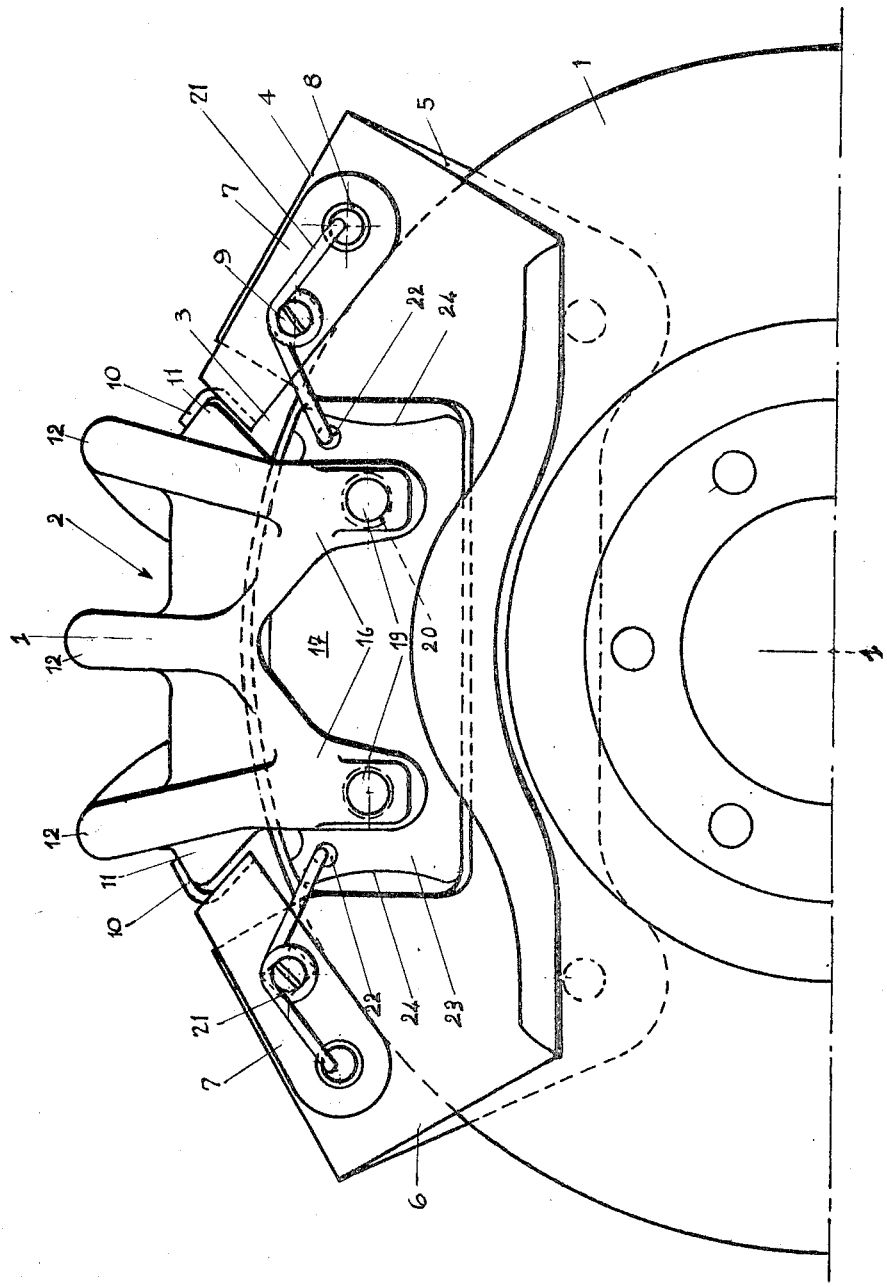
FIGURE 1 is a front view of a disk brake embodying the invention.

The brake embodiment shown in said FIGURE 1 comprises a disk 1 secured to a wheel. A stirrup designated generally as 2 straddles the disk and is housed in a recess 3 formed in a U-shaped fixed support 4 which comprises two limbs 5 and 6 located at the opposite sides of the disk. A clearance is provided between the stirrup and the boundaries of the recess. The lower portion of the limb 6 may be folded to form an angle with respect to the limb 5 to act as a rib increasing the rigidity of the construction. The axial movement of the stirrup is guided by the fixed support 4 by a pair of retractable guide levers 7 comprising a pair of arms arranged at the respective sides of the fixed support 4. The guide levers 7 are pivotally connected to the support through the intermediary of a tubular pin 8 extending through the limbs 5 and 6 forming the fixed support. The guide levers are locked in the position shown on the drawings by a clevis pin 9 with the extensions 10, integrally made with the levers overlapping a projection 11 at the respective ends of the stirrup to provide a guiding of the stirrup 2 with respect to the fixed support. The extensions 10 are of an adequate size to insure an efficient guiding of the stirrup by the fixed support and also limit the outward displacement of the stirrup.

The stirrup 2 may be formed as a casting provided with reinforcement ribs 12. In the stirrup is arranged a blind cylinder 13, located at one side of the disk in which is mounted a piston 14, which, upon pressurization of the cylinder, forces the adjacent friction pad 15 into engagement with one of the disk surfaces. The pressurization of said cylinder also exerts a reaction which results in displacement of pressure plate 16, forming part of the stirrup and located on the opposite side of the disk, thus forcing the adjacent friction pad 17 into engagement with the opposite disk surface.

The friction pads are of an elongated generally rectangular shape and are located in the recess 3; the anchorage ends of said pads are adapted to transmit the braking torque generated in operation to the respective edges of the recess.

The piston 14 is formed with an integral projection 18 extending into a preferably elongated recess provided in the adjacent friction pad 15. The pressure plate 16 is also formed with two projections 19 extending into corresponding recesses provided in the adjacent friction pad 17. One of these recesses, designated by the reference numeral 20, preferably has an elongated shape to facilitate the mounting of the friction pad 17.

Yielding means are provided to urge stirrup into engagement with the guide levers carried by the fixed support. These yielding means can include a torsion spring 21 associated with each of the arms of the guide lever. The springs are formed with a buckle mounted on the clevis 9 and one end of the springs projects into the tubular pin 8 while the opposite end of the springs acts on the respective friction pad. In the embodiment shown in FIGURE 1, the opposite ends of the springs project into a hole 22 formed in the iron sheet reinforcement plate 23 on which the friction pad is mounted. In another embodiment, not shown in the drawings, the other end of the spring is adapted to engage the lower edge of the friction pad. The reinforcement plate is formed with concave ends 24 whereby the anchorage edges of the friction pads are formed by friction material alone which merges onto the level corresponding to the plane of the friction pad opposite to the braking surface thereof. Due to the force applied by the torsion springs 21 the friction pads are urged outwardly i.e. towards the open end of the recess 3, and accordingly the stirrup interconnected with the friction pads is applied against the extensions 10 formed on the guide levers 7. The axial movement of the stirrup is thus guided by the fixed support 4 on which are secured the said guide levers 7.

Figure 2:
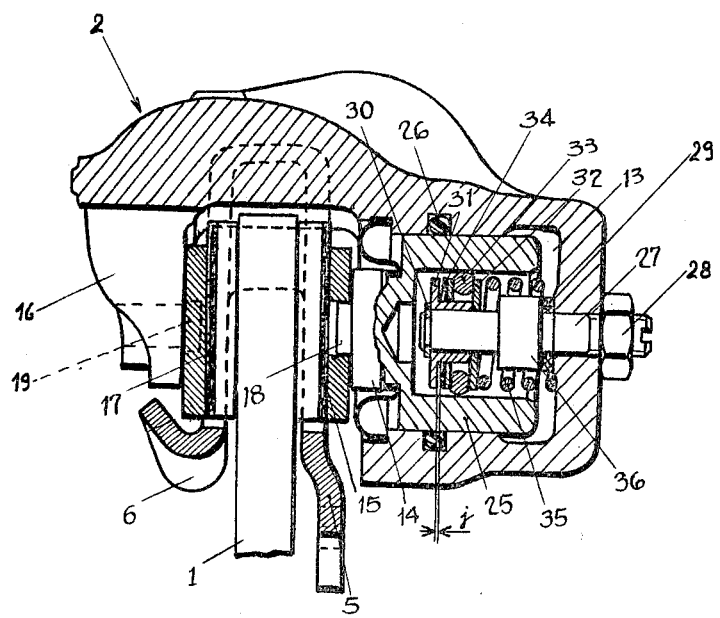
FIGURE 2 is a sectional view taken on line 1—1 of FIGURE 1.

It will be noted with reference to FIGURE 2 that the outer portion of the friction pads 15, 17 is kept at a certain distance from the arms of the adjacent guide levers 7 so that in case of jolts the friction pad will not come into engagement with the guide levers, thus eliminating the danger of friction pad erosion which subsisted in the prior brake constructions. Under the action of the springs 21, the lower edge of the friction pads clears the bottom of the recess 3.

The piston 14 is formed with a cylindrical skirt 25 which cooperates with a toric seal 26, preferably formed by an O-ring, made from rubber or a similar material, and located in an annular groove formed into the cylinder wall to insure an adequate sealing of the cylinder. An axial pin 27 is mounted in a hole formed in the cylinder head and is kept in position by means of a nut 28. A packing cup 29 inserted on the pin insures the sealing thereof. The pin 27 carried a stop ring 30 acting as an abutment for a double-diameter washer 31 which cooperates with a complementary washer 32 thus defining on the pin a groove in which is mounted the friction collar 33, formed by a cast metal split ring, which is kept in frictional engagement with the surface of the blind cylinder bore provided by the piston skirt. The piston is normally kept in rest position by a yielding washer 34 located between the friction collar 33 and the shoulder of the washer 31 and which applies the collar against the washer 32 loaded by a spring 35.

The means described form an automatic adjuster which operates as follows:

When pressure fluid is forced into cylinder 13 through an inlet port, not shown on the drawings, the piston 14 moves away from the blind cylinder head and carries therewith the friction collar 33 against the resistance exerted by the yielding washer 34. If the piston stroke does not exceed the clearance "j" corresponding to the flattening of the yielding washer 34, the friction collar 33 remains in place. If, due to the wear of the lining, the piston is moved to effect a stroke longer than the clearance "j" to bring the friction pads into engagement with the disk, the friction collar 33 is brought into engagement with the yielding washer 34 which is thus pressed against the shoulder of the double-diameter washer 31. The hydraulic force exerted on the piston being larger than the friction force exerted by the collar 33, the latter slides along the surface of the blind bore in the piston skirt for a length required for bringing the friction pads into engagement with the braking surfaces of the disk.

When the hydraulic pressure in the cylinder drops to a sufficiently low value, the piston return spring formed by the yielding washer 34 takes support onto the shoulder of the double-diameter washer 31 to urge the friction collar 33 and through the intermediary thereof the whole piston unit towards the head of the blind cylinder 13. The piston return stroke is thus equal to the clearance "j" whatever be the piston stroke during the preceeding braking operation.

The automatic adjuster described above is provided with a device enabling a temporary rearward movement of the piston with respect to the rest position determined by the friction collar when the piston is subjected to forces resulting from vibrations which might be due to the deflection of the disk. This device is formed by the spring 35 which damps the rearward movement of the unit including the piston 14, the friction collar 33 and the washer 32 and then returns the piston to the original position thereof. The force applied by the spring 35 is smaller than the force of friction exerted by the collar 33 onto the wall of the piston skirt 25 in order that the forces which cause the return movement of the piston determine a compression of the spring and prevent the friction collar from sliding in the bore of the piston skirt 25. It will be noted that the distance reserved in normal position between the end of the piston 14 and the adjacent cylinder head corresponds to the stroke provided for the spring 35.

The automatic adjuster with damping of the temporary rearward movement of the piston is adapted to insure a constant clearance "j" during the whole service life of the friction pads, whereby the rest position of the piston is displaced towards the open end of the cylinder as wear of the friction pads takes place.

To proceed with the replacement of the friction pads, the clevis 9 is withdrawn and the guide levers 7 are retracted by letting them pivot around the pins 8 to thus lift them with respect to the fixed support out of the path of the stirrup permitting withdrawal of the stirrup-and-friction pads assembly. The worn fraction pads are then withdrawn and are replaced by new ones. To bring the adjuster into the zero position, the piston is pressed inwardly, until the inner edge of the skirt 25 comes into engagement with the cylinder head. The friction collar 33 then takes abutment through the intermediary of the washer 32 on the enlarged projection 36 provided on the axial pin 27, and when no pressure is exerted on the piston, the spring 35 brings back the piston into the zero position, which is that shown in FIGURE 2.

In the embodiments shown in the other figures, the similar members are designated by the same reference numerals with addition of a hundred, from one figure to another.

The embodiment shown in FIGURE 3 is similar to the construction shown in FIGURES 1 and 2. In this embodiment, a recess is provided in the projections 111 formed at the respective ends of the stirrup and a block 37 of plastic material of low coefficient of friction is located in the recess. The extensions 110 protruding from the guide lever 107 engage the blocks 37. This construction facilitates the guiding of the stirrup by the fixed support.

In this embodiment each guide lever is equipped with a single torsion spring 38 having two legs each provided with a buckle mounted on the respective ends of the clevis 109. The axially extending junction element 39 of the spring takes support on a seat 40 formed on the respective arms of the guide lever and ends of these legs engage the friction pads in a manner similar to that of the embodiment shown on FIGURE 1. The unit formed by the stirrup and by the friction pads connected thereto is urged by the springs 38 into engagement with the guide lever extensions 110, whereby in this embodiment the lower edge of the friction pads is withdrawn from the bottom of the recess 103, and the stirrup takes a yielding abutment on the fixed support.

In the embodiment shown in FIGURE 4, the torsion springs are replaced by a yielding member formed by a tubular sheath 41, made of rubber or any similar material, adapted to be reinforced by a metal fitting such as a yielding split sleeve 42. This yielding member is located between the inclined extensions 210 protruding from the guide arms 207 and the respective projections 211 formed at the ends of the stirrup. Preferably the sheath 41 is located in a recess 43 formed below the projections. The guide lever extensions 210 have such an inclination that the force exerted onto the stirrup by the yielding member (sheath 41-split sleeve 42) has a component directed towards the outward periphery of the recess 203 which brings the stirrup into engagement with the guide lever extensions 210 and provides proper guiding of the stirrup by the fixed support. The yielding sheaths also enable the taking up of the manufacturing tolerances as well as the suppression of noise due to the yielding suspension of the stirrup effected by the sheaths. In this embodiment, as well as in those described above, the lower edge of the friction pads clears the bottom of the recess, the friction pads being positioned in the recess by the stirrup.

The yielding member can also be formed by a blade spring, by a coil spring etc. It is also possible to associate a spring similar to those embodied in the construction shown in FIGURE 3 with a yielding sheath made of rubber or similar material, whereby the spring legs take abutment on the fixed support while their axially extending junction element presses the sheath into engagement with the stirrup on the whole length of the sheath. With this spring arrangement, which is also applicable to disk brakes with a floating stirrup guided by the friction pads, one single spring can be used and mounted at the leading edge of the friction pads. The use of a single spring suppresses the tendency of instability which might occur in case of the use of two springs each mounted at their respective end of the friction pads.

FIGURE 5 shows the preferred embodiment of the invention in which a yielding sheath 44 is interposed between the extensions 310 and the outward surface of the projections 311, whereby the stirrup is urged towards the bottom of the recess 303 and brings the lower edge of the friction pads connected thereto into engagement with the seat 45 formed at the bottom of the recess 303. The braking torque created in operation is transmitted by the friction pads to the lateral edges of the recess 303 formed in the respective limbs. This construction pistons friction pads rigorously parallel to the braking surfaces of the disk. Moreover, this construction enables the location of the yielding member outwardly of the stirrup, and thus provides the possibility of constructing a yielding member of sufficient size to provide proper guiding of the stirrup.

The lower edge of the friction pads can be formed partly, or on the whole length thereof, by friction material alone which has for an effect the reduction of noise. Also, the upper ends of the friction pads are spaced for an appreciable distance from the guide levers, so that the friction pads cannot bump against the guide levers, thus suppressing the danger of local erosion of the friction pads.

Although this invention has been described in connection with specific embodiments, it will be obvious to those skilled in the art that various changes may be made in the form, structure and arrangement of parts without departing from the spirit of the invention. It is our intention not to be limited to the specific embodiments disclosed for purposes of illustration.

We claim:

1. A disk brake comprising: a rotor having a pair of opposed friction surfaces thereon, a support having a pair of circumferentially spaced arms extending generally parallel to one of said friction surfaces, then in an axial direction across the periphery of said rotor and then in a direction radially inwards parallel to the other of said friction surfaces, a friction member located between said arms on each side of said rotor, a generally U-shaped stirrup straddling said rotor and said friction members, one leg of said stirrup being operatively connected to one of said friction members, actuating means carried by the other of said legs and operatively connected to the other of said friction members, said stirrup having a pair of circumferentially spaced end portions, a pair of levers each pivotally mounted on a respective one of said arms and having a guide portion thereon located radially outwards of and overlapping a respective one of said circumferentially spaced end portions of said stirrup for guiding said stirrup, and means for releasably securing said levers in a substantially fixed position on said support member.

2. The structure as recited in claim 1 wherein said support member includes portions interconnecting said arms on each side of said rotor, a resilient member is squeezed between said end portions of said stirrup and said lever portions to urge said stirrup radially inwards and thereby said friction members against the portion of said support member which interconnects said arms on both sides of said rotor.

3. A disk brake comprising: a rotor having a pair of opposed friction surfaces thereon, a support having a pair of circumferentially spaced arms extending generally parallel to one of said friction surfaces, then in an axial direction across the periphery of said rotor and then in a direction radially inwards parallel to the other of said friction surfaces, a friction member located between said arms on each side of said rotor, a generally U-shaped stirrup straddling said rotor and said friction members, one leg of said stirrup being operatively connected to one of said friction members, actuating means carried by the other of said legs and operatively connected to the other of said friction members, said stirrup having a pair of circumferentially spaced end portions, a pair of levers each pivotally mounted on a respective one of said arms and having a guide portion thereon located radially outwards of and overlapping a respective one of said circumferentially spaced end portions of said stirrup, means operatively connected to said support member and operatively connected to said stirrup for biasing said stirrup radially outwardly into engagement with said lever member guide portions, and means for releasably securing said levers in a substantially fixed position on said support member.

4. The structure as recited in claim 3 wherein said biasing means is a torsion spring coiled intermediate the ends thereof with one end being operatively connected to said support member and the other end being operatively connected to said stirrup.

5. The structure as recited in claim 3 wherein said biasing means is a torsion spring coiled intermediate the ends thereof with one end being operatively connected to said support member and the other end being operatively connected to said friction members.

6. The structure as recited in claim 3 wherein a surface is provided on the circumferentially spaced ends of said stirrup, each of said levers has a surface facing a respective one of said stirrup surfaces, said biasing means is a pair of resilient members each of which are squeezed between a respective set of said stirrup and lever surfaces, each set of said stirrup and lever surfaces and said resilient members are located radially inwardly of said stirrup end portions and said lever portions.

7. A disk brake comprising: a rotor having a pair of opposed friction surfaces thereon, a support having a pair of circumferentially spaced arms extending generally parallel to one of said friction surfaces, then in an axial direction across the periphery of said rotor and then in a direction radially inwards parallel to the other of said friction surfaces, a friction member located between said arms on each side of said rotor, a generally U-shaped stirrup straddling said rotor and said friction members, one leg of said stirrup being operatively connected to one of said friction members, actuating means carried by the other of said legs and operatively connected to the other of said friction members, said stirrup having a pair of circumferentially spaced end portions, a pair of guide members taking support on a respective one of said arms and having a guide portion thereon located radially outwards of and overlapping a respective one of said circumferentially spaced end portions of said stirrup, means operatively connected to said support member and operatively connected to said stirrup for biasing said stirrup radially outwardly into engagement with said guide portions, and means for releasably securing said guide members in a substantially fixed position relative to said support member.

8. A disk brake comprising: a rotor having a pair of opposed friction surfaces thereon, a support having a pair of circumferentially spaced arms extending generally parallel to one of said friction surfaces, then in an axial direction across the periphery of said rotor and then in a direction radially inwards parallel to the other of said friction surfaces, a friction member located between said arms on each side of said rotor, a generally U-shaped stirrup straddling said rotor and said friction members, one leg of said stirrup being operatively connected to one of said friction members, actuating means carried by the other of said legs and operatively connected to the other of said friction members, said stirrup having a pair of circumferentially spaced end portions, a pair of guide members taking support on a respective one of said arms and having a guide portion thereon located radially outwards and overlapping a respective one of said circumferentially spaced end portions of said stirrup, and spring means operatively connected to said support member and operatively connected to said stirrup for biasing said stirrup radially outwardly into engagement with said guide portions.

9. The structure as recited in claim 8 wherein said operative connection between said spring means and said support member is a each arm of said support member.

10. A disk brake comprising: a rotor having a pair of opposed friction surfaces thereon, a support having a pair of circumferentially spaced arms extending generally parallel to one of said friction surfaces, then in an axial direction across the periphery of said rotor and then in a direction radially inwards parallel to the other of said friction surfaces, a friction member located between said arms on each side of said rotor, a generally U-shaped stirrup straddling said rotor and said friction members, one leg of said stirrup being operatively connected to one of said friction members, actuating means carried by the other of said legs and operatively connected to the other of said friction members, said stirrup having a pair of circumferentially spaced end portions, a pair of locking members each operatively connected to a respective one of said arms and having a guide portion thereon located radially outwards of and overlapping a respective one of said circumferentially spaced end portions of said stirrup for guiding said stirrup, and means for releasably holding said locking members in a substantially fixed position relative to said support member.

11. A disk brake comprising: a rotor having a pair of opposed friction surfaces thereon, a support having a pair of circumferentially spaced arms extending generally parallel to one of said friction surfaces, then in an axial direction across the periphery of said rotor and then in a direction radially inwards parallel to the other of said friction surfaces, a friction member located between said arms on each side of said rotor, a generally U-shaped stirrup straddling said rotor and said friction members, one leg of said stirrup being operatively connected to one of said friction members, actuating means carried by the other of said legs and operatively connected to the other of said friction members, said stirrup having a pair of circumferentially spaced end portions, a pair of guide portions each operatively connected to a respective one of said arms and in a substantially fixed position relative to said support member being located radially outwards of and overlapping a respective one of said circumferentially spaced end portions of said stirrup for guiding said stirrup, and means for releasably holding at least one of said guide portions in its said substantially fixed position.

References Cited by the Examiner

FOREIGN PATENTS 77,016  11/1961  France.

MILTON BUCHLER, *Primary Examiner.*

G. E. A. HALVOSA, *Assistant Examiner.*